(12) United States Patent
Fukushima (10) Patent No.: US 6,889,532 B2
(45) Date of Patent: May 10, 2005

(54) ELECTRICALLY OPERATED STEERING SHAFT LOCK DEVICE

(75) Inventor: Keisuke Fukushima, Aki-gun (JP)

(73) Assignee: U-Shin Ltd., Tokyo (JP)

( * ) Notice: Subject to any disclaimer, the term of this patent is extended or adjusted under 35 U.S.C. 154(b) by 4 days.

(21) Appl. No.: 10/679,410

(22) Filed: Oct. 7, 2003

(65) Prior Publication Data

US 2004/0069027 A1 Apr. 15, 2004

(30) Foreign Application Priority Data

Oct. 10, 2002 (JP) .................................... 2002-298092
Oct. 10, 2002 (JP) .................................... 2002-298093

(51) Int. Cl.[7] .............................................. B60R 25/02
(52) U.S. Cl. ............................ 70/185; 70/183; 70/252
(58) Field of Search ........................... 70/182–186, 252

(56) References Cited

U.S. PATENT DOCUMENTS

| | | | | |
|---|---|---|---|---|
| 1,394,872 A | * | 10/1921 | White ........................ | 70/183 |
| 1,442,003 A | * | 1/1923 | Rohrer ...................... | 74/577 S |
| 2,964,935 A | * | 12/1960 | Lombardi .................. | 70/252 |
| 3,400,563 A | * | 9/1968 | Lempke et al. ............ | 70/184 |
| 4,267,748 A | * | 5/1981 | Grunewald et al. ....... | 74/577 S |
| 4,576,024 A | * | 3/1986 | Weber ....................... | 70/252 |
| 4,984,481 A | * | 1/1991 | Jawdoszyn ................ | 70/252 |
| 5,092,147 A | * | 3/1992 | Mochida et al. .......... | 70/252 |
| 6,053,067 A | * | 4/2000 | Garnault et al. .......... | 70/184 |
| 6,234,039 B1 | * | 5/2001 | Garnault et al. .......... | 70/184 |

FOREIGN PATENT DOCUMENTS

| | | |
|---|---|---|
| JP | 3174008 | 3/2001 |
| JP | 2002-234419 | 8/2002 |

* cited by examiner

Primary Examiner—Daniel P. Stodola
Assistant Examiner—Christopher Boswell
(74) Attorney, Agent, or Firm—Wenderoth, Lind & Ponack, L.L.P.

(57) ABSTRACT

An electrically-operated steering lock device is capable of unlocking a steering shaft even when steering wheel torque is applied to the steering shaft. The electrically-operated steering lock device comprises a lock bolt structure for locking the steering shaft. The lock bolt structure is composed of a first lock bolt which is pivotably held on one radial side in a neighborhood of the steering shaft and which has a protruding piece to be engaged on its inner peripheral side with a receiving portion of the steering shaft, and a second lock bolt which is pivotably held on another radial side in the neighborhood of the steering shaft. The second lock bolt is rotatable to a protruding position and a retreat position along with the first lock bolt, and has a protruding piece to be engaged on its inner peripheral side with the receiving portion of the steering shaft. The protruding pieces of the lock bolts are each moved in a direction away from respective engaging surfaces of the receiving portion of the steering shaft when engagement is to be released.

20 Claims, 11 Drawing Sheets

Fig. 13

ELECTRICALLY OPERATED STEERING SHAFT LOCK DEVICE

BACKGROUND OF THE INVENTION

The present invention relates to an electrically-operated steering lock device.

A conventional electrically-operated steering lock device is so designed that, for locking of a steering shaft of a vehicle, a lock bolt is protruded toward a steering shaft by biasing force of a spring so as to be engaged with a recessed portion of the steering shaft, by which the steering shaft is locked. Further, an electric motor, which is a lock bolt driving device, is rotationally driven so that the lock bolt engaged with the steering shaft is withdrawn from the recessed portion, by which the steering shaft is unlocked.

Then, with the steering shaft in a locked state, while a so-called steering wheel torque is applied to the steering shaft, the lock bolt is burdened with a load in a rotational direction of the steering shaft. As a result of this, engagement between the lock bolt and the recessed portion of the steering shaft becomes tighter, thereby making it more difficult for the lock bolt to be removed from the recessed portion.

Therefore, in such a state, even if the electric motor is rotationally driven, it can occur that the lock bolt will not come out of the recessed portion on account of this load. In this case, after the steering wheel is moved to some extent to release the steering wheel torque, the electric motor is actuated again, thus allowing the lock bolt to come out of the recessed portion. However, for causing the lock bolt to come out of the recessed portion, as shown above, there is a troublesome requirement in that the electric motor is started twice, which can be predicted to lead to a reduction in a service life of the electric motor.

As a countermeasure for this, an electrically-operated steering lock device described in Japanese Patent No. 3174008 (hereinafter, referred to as "Patent Reference 1") is provided with a locking member for locking a steering shaft, an unlocking spring member for biasing the locking member toward an unlocking position, and a drive member which actuates the locking member toward the unlocking position via the unlocking spring member and which is actuated by an electric motor. In a state that a steering wheel torque is acting on the locking member, a displacement of the drive member by the electric motor is absorbed by the unlocking spring member, so that spring force is accumulated. Then, when the steering wheel torque is released, the locking member is moved to the unlocking position by the accumulated force of the unlocking spring member, by which the steering shaft is unlocked. As a result of this, it is possible to unlock the steering shaft without starting the electric motor twice.

However, with the steering lock device of this Patent Reference 1, there has been a problem in that an operator, in order to release the steering wheel torque, is required to operate the steering shaft each time, which is troublesome.

Further, with the steering lock device this Patent Reference 1, the locking member is protruded toward the steering shaft by biasing force of the spring member so as to be engaged with a locking recess of the steering shaft, by which the steering shaft is locked.

However, with this structure, there is a possibility that the steering shaft might illicitly be unlocked by operating the locking member against the biasing force of the spring member, by a magnet or the like, with an aim of theft.

As a countermeasure for this, it is conceivable that the spring member for biasing the locking member toward the lock position is changed to one of a stronger spring force. However, in such a case, the electric motor to be used for actuating the locking member against the biasing force of the spring member needs to be a large-sized electric motor of large operating torque. This would lead to a problem in that power consumption is increased, and would also cause the electrically-operated steering lock device to be increased in size.

As another prior art, on the other hand, whereas a conventional electrically-operated steering lock device is so designed generally that a lock bolt which is to be engaged with a steering shaft to lock the steering shaft is actuated by driving force of a motor or the like to lock or unlock the steering shaft, an electrically-operated steering lock mechanism described in Japanese Patent Laid-Open Publication No. 2002-234419 (hereinafter, referred to as "Patent Reference 2") is so designed that a plate cam for moving a lock pin (equivalent to the lock bolt) is driven by a motor to cause a plunger of a solenoid to be protruded into an engagement recessed portion of the plate cam, thereby restraining rotation of the plate cam, so that the motor is prevented from malfunctioning due to electrical noise. Further, for prevention of malfunctions of the solenoid due to electrical noise, power for the solenoid is interrupted in response to operation of a start-up device provided on a vehicle to be controlled by the steering shaft, thereby maintaining the motor in a restrained state by the solenoid.

However, with the steering lock mechanism of this Patent Reference 2, there is a possibility that vibrations of the vehicle due to its running might cause the plunger of the solenoid to be moved, thereby making the motor deregulated. Further, while the plunger of the solenoid is not protruded into the engagement recessed portion of the plate cam, it can occur that power for the solenoid may be interrupted for some reason, thereby putting the motor in an operable state.

SUMMARY OF THE INVENTION

Accordingly, in a first aspect of the present invention, which has been accomplished in view of the above-described problems of the prior art, a first object of the invention is to provide an electrically-operated steering lock device which is capable of unlocking a steering shaft even when steering wheel torque is applied to the steering shaft, and which is improved in terms of an anti-theft property.

Additionally, in a second aspect of the present invention, which has been accomplished in view of the above issues of the another prior art, a second object of the invention is to provide an electrically-operated steering lock device which is prevented from malfunctions of a motor serving for actuating a lock bolt, and thus which is of high safety.

As a solution to the above-described first object, in the first aspect of the invention, there is provided an electrically-operated steering lock device comprising a lock bolt structure which is movable between a protruding position where a steering shaft is locked and a retreat position where the steering shaft is unlocked, and an actuating device for actuating the lock bolt structure so as to move from the protruding position to the retreat position. The lock bolt structure is composed of a first lock bolt, which is pivotably held on one radial side in a neighborhood of the steering shaft and which has a protruding piece to be engaged on its inner peripheral side with a receiving portion of the steering shaft, and a second lock bolt which is pivotably held on another radial side in the neighborhood of the steering shaft, which is rotatable to the protruding position and the retreat position along with the first lock bolt and which has a protruding piece to be engaged on its inner peripheral side with the receiving portion of the steering shaft. The protruding pieces of these two lock bolts are each moved in such a direction as to be removed from respective engaging surfaces of the receiving portion of the steering shaft when engagement is to be released.

With this constitution, the protruding pieces of the first and second lock bolts to be engaged with the receiving portion of the steering shaft are allowed to come out of the receiving portion while being actuated in directions as to go away from a respective engaging surface of the receiving portion of the steering shaft. Therefore, a degree of engagement between the receiving portion and the protruding pieces is reduced, so that the protruding pieces can be easily removed from the receiving portion. As a result, there can be eliminated a malfunction in that the steering shaft cannot be unlocked even with a torque is applied to the steering shaft.

Also, in the electrically-operated steering lock device of the first aspect of the invention, it is also possible that each of the protruding pieces of the two lock bolts has a sloped surface provided on its outer peripheral side for avoiding interference with the receiving portion of the steering shaft.

With this constitution, the protruding pieces of the two lock bolts come to be engaged with the receiving portion of the steering shaft only on their inner peripheral sides, respectively, while the sloped surfaces provided on the outer peripheral sides of the protruding pieces do not interfere with the receiving portion of the steering shaft when the protruding pieces come out of the receiving portion. Therefore, the lock bolts can reliably be actuated from the protruding position to the retreat position.

Further, in the electrically-operated steering lock device of the first aspect of the invention, it is also possible that the actuating device comprises a cam member which has a first cam wall surface for causing the first lock bolt to rotate from the protruding position to the retreat position, and a second cam wall surface for causing the first lock bolt to rotate from the retreat position to the protruding position, and also comprises a coupling mechanism for actuating the second lock bolt in response to actuation of the first lock bolt along therewith, wherein the first lock bolt is held in the protruding position by the cam member.

With this constitution, since the lock bolts are actuated to the protruding position and the retreat position by the cam member, there is no need for any biasing member for biasing the lock bolts to the protruding position or the retreat position. Further, since the lock bolts are held in the protruding position by the cam member, operation of the lock bolts by a magnet or the like, with an aim of theft, cannot be achieved. Thus, an anti-theft property is improved.

Further, in the electrically-operated steering lock device of the first aspect of the invention, it is also possible that each of the protruding pieces of the two lock bolts has an acceptance surface provided on its inner peripheral side for accepting torque of the steering shaft in a direction generally orthogonal to a rotational direction of each of the first and second lock bolts.

With this constitution, even if a steering wheel torque is applied to the steering shaft, almost no force in the rotational direction is exerted to the first and second lock bolts. As a result, load on the cam member that is in contact with the first lock bolt can be reduced, and the cam member becomes operable with application of a smaller force.

Furthermore, in the electrically-operated steering lock device of the first aspect of the invention, it is also possible that the electrically-operated steering lock device further comprises a spring for biasing the cam member in a direction toward a lock position, and a rotor which has an engagement portion to be brought into contact with one end side of the spring to cause the cam member to rotate toward the lock position via the spring. The rotor is rotated by drive of a motor so as to make the cam member rotate, wherein when the lock bolt structure is unable to be actuated to the protruding position, the spring absorbs movement of the rotor and biases the cam member toward the lock position.

With this constitution, the rotor is allowed to rotate to its lock position even when the lock bolts are inhibited from being protruded to the protruding position, and the lock bolts are automatically protruded by the biasing force of the spring when the lock bolts have become protrudable, thus making it possible to lock the steering shaft. Therefore, it is no longer necessary to actuate a motor twice to actuate the rotor. Further, since this spring is provided on the cam member, operating the lock bolts does not cause the spring to be actuated, so that the steering shaft is not unlocked.

As a solution to the above-described second object, on the other hand, in a second aspect of the present invention, there is provided an electrically-operated steering lock device comprising a lock bolt structure which is movable between a protruding position where a steering shaft is locked and a retreat position where the steering shaft is unlocked, and an actuator for actuating the lock bolt structure and, at least, holding the lock bolt structure in the retreat position in an inactive state. The electrically-operated steering lock device further comprises a power supply control device for controlling conduction to the actuator, wherein the power supply control device, upon receiving a vehicle state signal from a vehicle, interrupts conduction to the actuator.

With this constitution, it is decided by the vehicle state signal that lock bolts of the lock bolt structure are in an unnecessary-to-actuate state. Thus, by interrupting power supply for the actuator itself that actuates the lock bolts, malfunctions of the actuator can be prevented, so that the lock bolts can reliably be maintained in the retreat position.

Also, in the electrically-operated steering lock device of the second aspect of the invention, it is also possible that the vehicle state signal is a signal generated by an operational position of an ignition switch for starting an engine of the vehicle.

With this constitution, since power supply for the actuator is interrupted by the operational position of the ignition switch that changes a state of the vehicle by manual operation, power supply for the actuator can be interrupted more reliably.

Further, in the electrically-operated steering lock device of the second aspect of the invention, it is also possible that the electrically-operated steering lock device further comprises a cam member which is actuated by the actuator so as to be engaged with the lock bolts for actuating the lock bolts, and which, when placed in a lock position, holds the lock bolts in the protruding position.

With this constitution, since the cam member for holding the lock bolts in the protruding position is provided, it never occurs that the lock bolts are moved to the retreat position by vibrations due to running of the vehicle. Thus, the lock bolts can be maintained in the retreat position more reliably.

DESCRIPTION OF THE DRAWINGS

The present invention will be further described with reference to the accompanying drawings wherein like reference numerals refer to like parts in several views, and wherein.

DETAILED DESCRIPTION OF THE PREFERRED EMBODIMENTS

Figure 1:
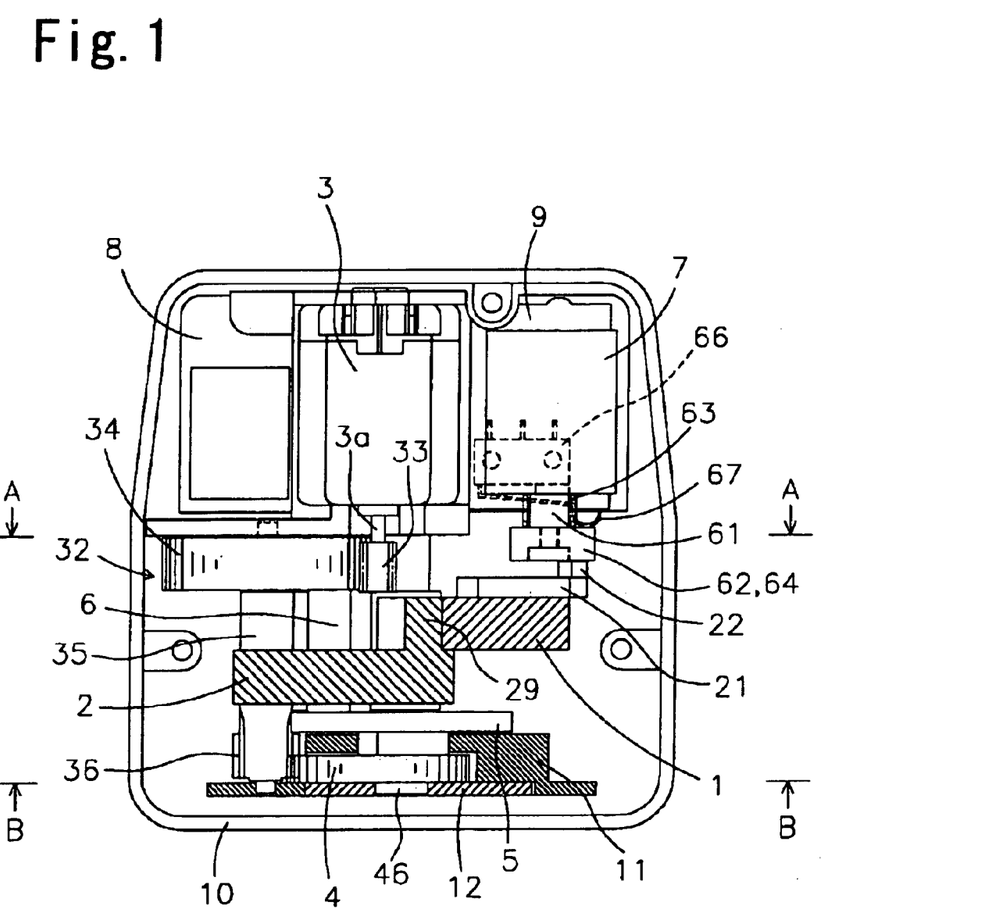
FIG. 1 is a sectional top view showing an electrically-operated steering lock device according to an embodiment of the present invention.
Figure 2:
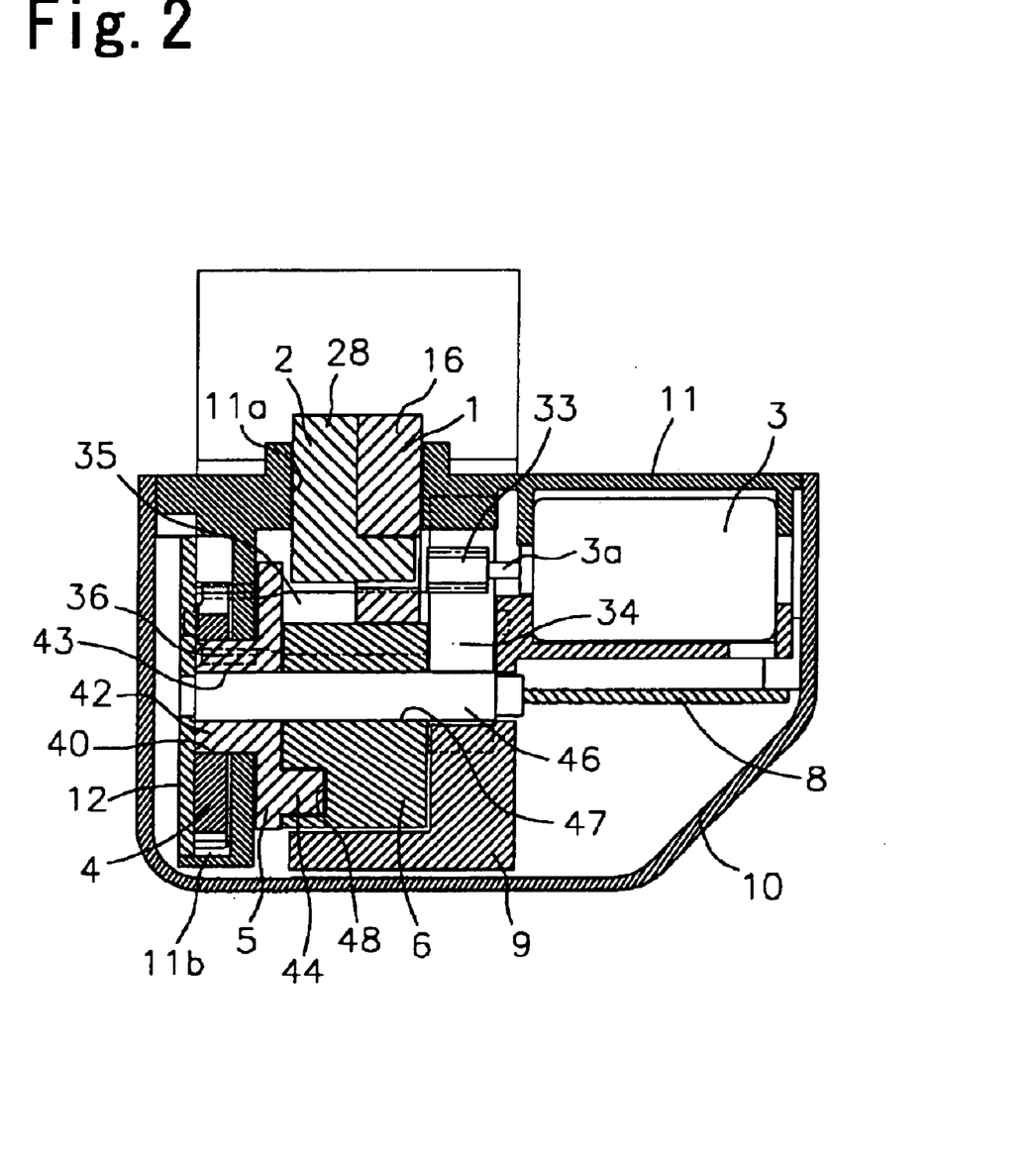
FIG. 2 is a sectional side view showing the electrically-operated steering lock device according to the embodiment of the invention.
Figure 3:
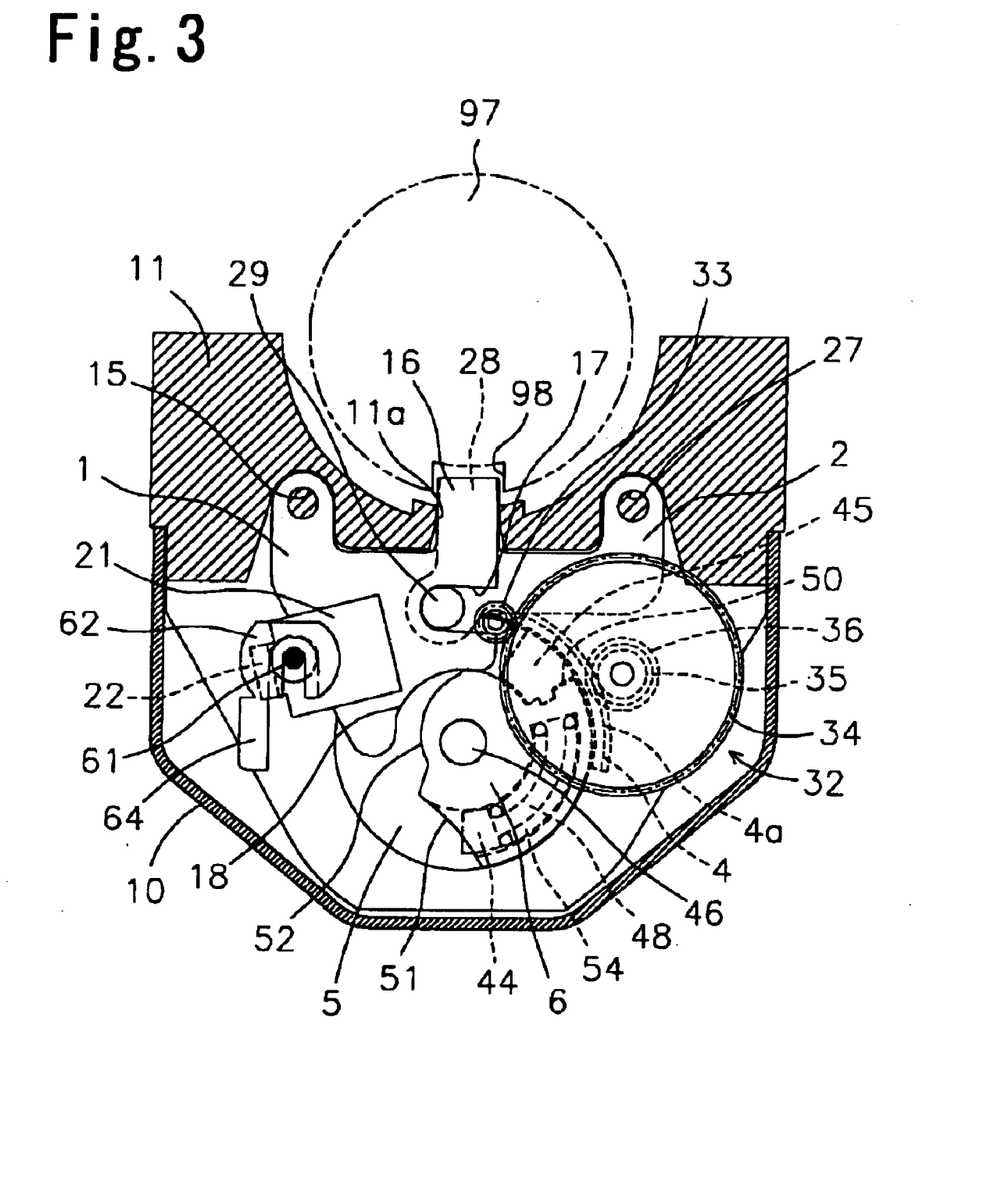
FIG. 3 is a sectional front view taken along line A—A of FIG. 1.

FIGS. 1, 2 and 3 show an electrically-operated steering lock device according to first and second aspects of the present invention. This electrically-operated steering lock device is so constructed that a first lock bolt 1, a second lock bolt 2, a motor 3 which is an actuator, a final reduction gear 4, a rotor 5, a cam member 6 which is an actuating device, a solenoid 7, a printed circuit board 8, and a base 9 for fixing the foregoing members are all arranged within a housing 10 and housed therein with a cover 11.

Figure 8:
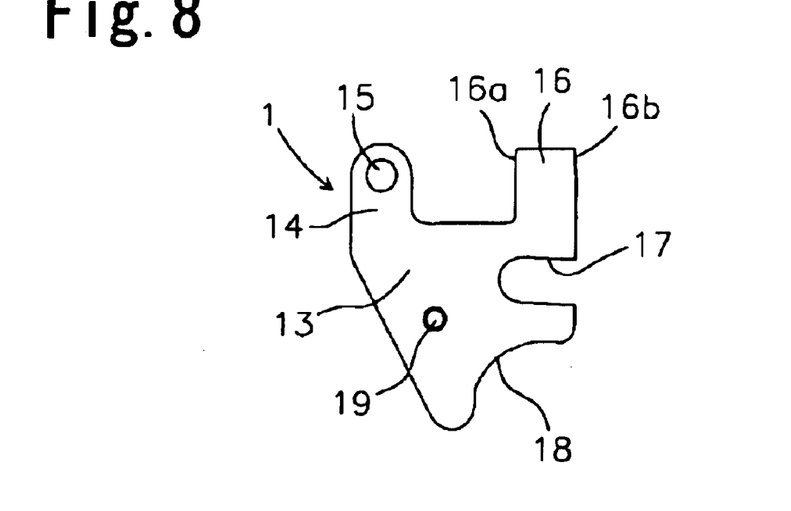
FIG. 8 is a front view of a first lock bolt of the electrically-operated steering lock device according to the embodiment of the invention.

As shown in FIG. 8, the first lock bolt 1 is formed of a plate-shaped body portion 13, wherein a bearing portion 14 is protrusively provided on one end side of a top surface of the body portion 13 and a bearing hole 15 is bored at a tip end portion of the bearing portion 14. On another end side of the top surface of the body portion 13 is provided a protruding piece 16 protruding parallel to the bearing portion 14. This protruding piece 16, as shown in FIG. 3, is so designed as to protrude outwardly from a through hole 11a of the cover 11 when the first lock bolt 1, rotatably held at the bearing hole 15 by the cover 11, is rotated in a protruding direction (counterclockwise). The protruding piece 16 in this protruded state is engaged with a receiving portion 98 of a steering shaft 97 of a vehicle, thereby locking the steering shaft 97.

Figure 6:
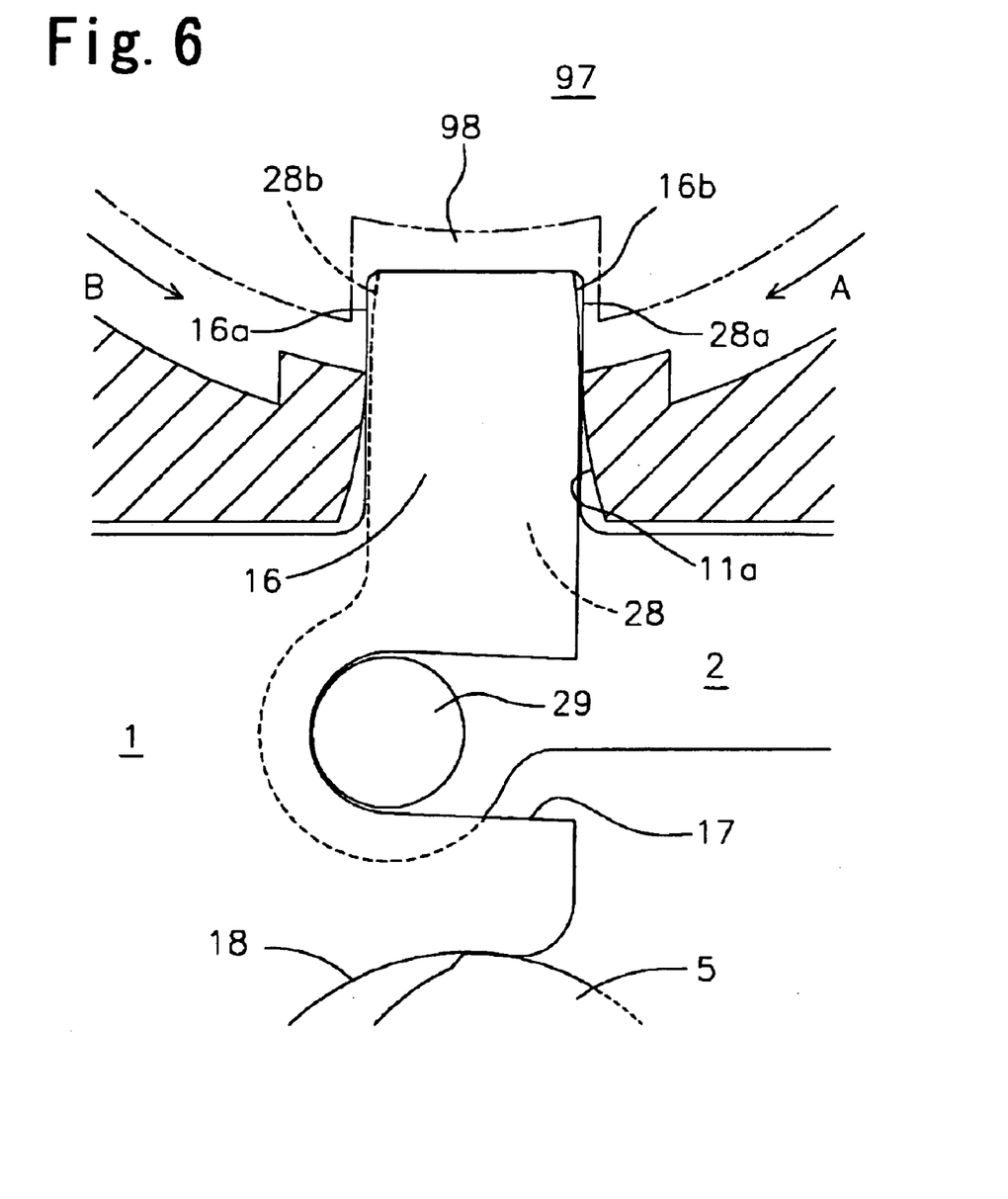
FIG. 6 is a partly enlarged view of FIG. 3.

Also, on one side face of the protruding piece 16 on the bearing portion 14 side is formed an acceptance surface 16a, which is a surface engaged with the receiving portion 98 of the steering shaft 97, as shown in FIG. 6. An engagement position of this acceptance surface 16a and receiving portion 98 is so set as to be slightly upward, as viewed in FIG. 6, of the bearing portion 14 on which the first lock bolt 1 is pivotably held, so that when the protruding piece 16 leaves the receiving portion 98, the acceptance surface 16a of the protruding piece 16 moves so as to go slightly away from its confronting surface of the receiving portion 98. Meanwhile, on another side surface of the protruding piece 16 is provided a sloped surface 16b for avoiding interference with the receiving portion 98 during rotation of the first lock bolt 1. Further, a coupling-use elongate hole 17 is formed on a lower side of the protruding piece 16. Furthermore, a contact surface 18 formed into a generally circular-arc shape, with which later-described cam member 6 comes into contact, is formed on a lower end face of the body portion 13. Also, on a front-face side of the first lock bolt 1 is provided a convex portion 19 onto which an engagement piece 21 having an engagement protruding portion 22 is to be engaged and fixed.

Figure 9:
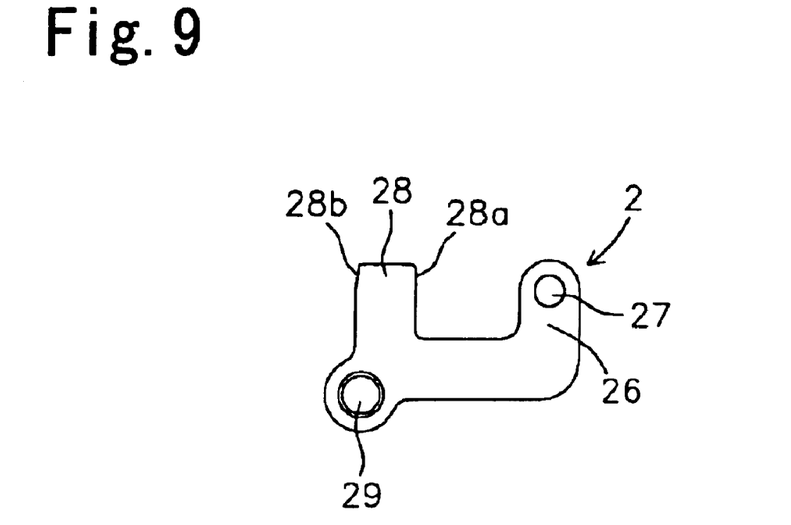
FIG. 9 is a front view of a second lock bolt of the electrically-operated steering lock device according to the embodiment of the invention.

As shown in FIG. 9, the second lock bolt 2 is formed into a generally U-shaped plate-like member, and a bearing portion 26 is protrusively provided on the right side of a top surface as viewed in this figure, and further a bearing hole 27 is bored at its tip end portion. On the left side of the top surface of the second lock bolt 2 is provided a protruding piece 28 which protrudes parallel to the bearing portion 26. On a lower side of this protruding piece 28 is provided a coupling convex portion 29 which enters the coupling-use elongate hole 17 of the first lock bolt 1 so as to be engaged therewith, and this coupling convex portion 29 and the coupling-use elongate hole 17 constitute a coupling mechanism. This second lock bolt 2, as shown in FIG. 3, is so constructed as to be pivotably held at the bearing hole 27 by the cover 11 on one side opposite to the side on which the first lock bolt 1 is located, with the steering shaft 97 interposed therebetween. The coupling convex portion 29 of the second lock bolt 2 is to be engaged with the coupling-use elongate hole 17, by which the second lock bolt 2 is adapted to be interlocked with the first lock bolt 1. Thus, as the first lock bolt 1 is rotated in a protruding direction, the second lock bolt 2 is interlocked therewith and rotated together in the protruding direction, while the protruding piece 28 of the second lock bolt 2 is protruded outwardly from the through hole 11a of the cover 11 simultaneously with the protruding piece 16 of the first lock bolt 1. The protruding piece 28 in this protruded state is engaged with the receiving portion 98 of the steering shaft 97 of the vehicle together with the protruding piece 16 of the first lock bolt 1, thereby locking the steering shaft 97.

Also, in the second lock bolt 2, an acceptance surface 28a, which is a surface to be engaged with the receiving portion 98 of the steering shaft 97, is formed on one side face of the protruding piece 28 facing the bearing portion 26 as shown in FIG. 6. An engagement position of this acceptance surface 28a and receiving portion 98 is so set as to be slightly upward, as viewed in FIG. 6, of the bearing portion 27 by which the second lock bolt 2 is pivotably held, so that when the protruding piece 28 leaves the receiving portion 98, the acceptance surface 28a moves so as to go slightly away from its confronting surface of the receiving portion 98. Meanwhile, on another side surface of the protruding piece 28 is provided a sloped surface 28b for avoiding interference with the receiving portion 98 during rotation of the second lock bolt 2.

The motor 3, which is connected to a motor drive relay 81 (shown in FIG. 12) via unshown lines laid in the housing 10, is rotated forwardly and reversely by control of the motor drive relay 81 via a later-described control unit 76. This motor 3, as shown in FIGS. 1, 2 and 3, rotates the final reduction gear 4 via a rotating mechanism 32. This rotating mechanism 32 is composed of a pinion 33 fitted to a drive shaft 3a of the motor 3, a large-diameter wheel 34 to be meshed with this pinion 33, and a coaxial small-diameter wheel 36 integrally provided with a rotating shaft 35 of the large-diameter wheel 34. The small-diameter wheel 36 is to be meshed with a segment gear 4a formed on an outer periphery of the final reduction gear 4. As a result of this, as the small-diameter wheel 36 is rotated clockwise as viewed in FIG. 3, the final reduction gear 4 is rotated counterclockwise. Conversely, as the small-diameter wheel 36 is reversely rotated counterclockwise as viewed in FIG. 1, the final reduction gear 4 is rotated clockwise.

Figure 7:
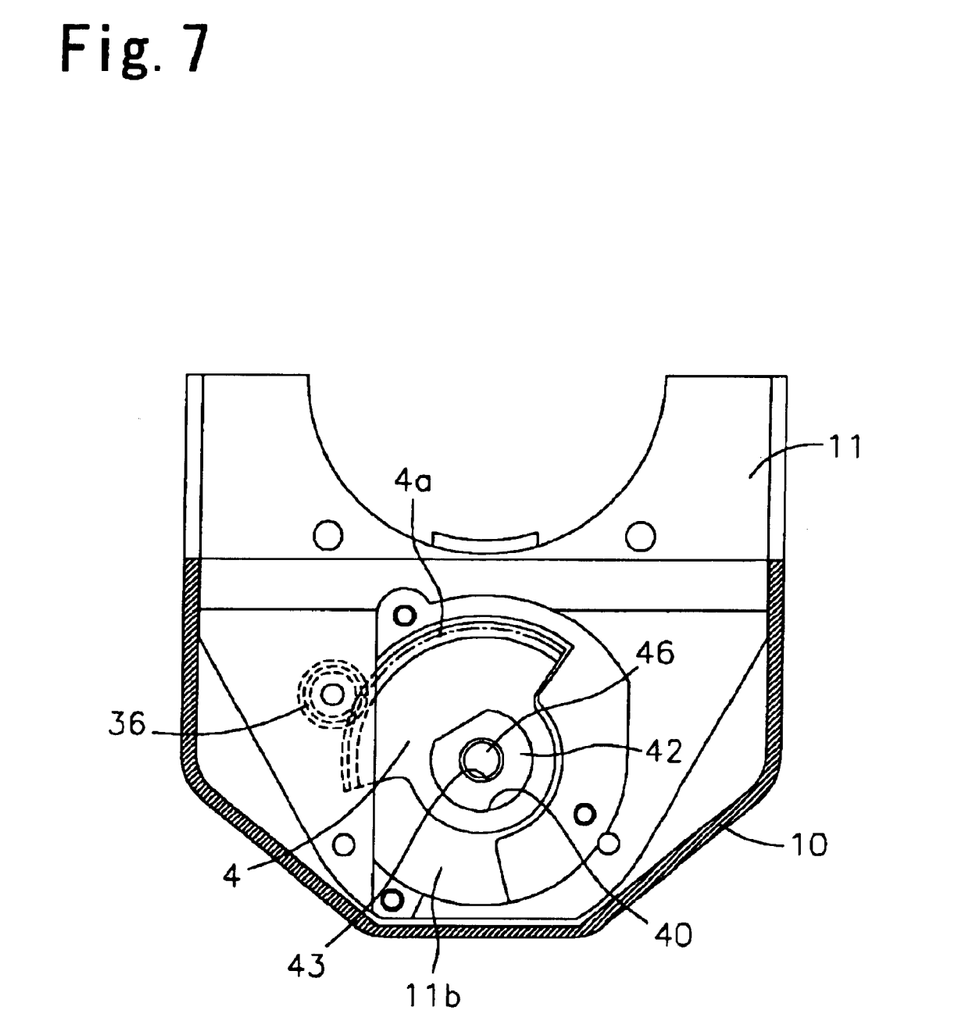
FIG. 7 is a sectional view taken along line B—B of FIG. 1.

The final reduction gear 4 is formed into a generally fan shape with the segment gear 4a formed on its outer periphery as shown in FIG. 7, and a generally D-shaped coupling hole 40 is formed at a center of the final reduction gear 4. This final reduction gear 4 is rotatably accommodated in a generally fan-shaped accommodation recessed portion 11b provided in the cover 11, and regulated in terms of its rotational range.

Figure 10A:
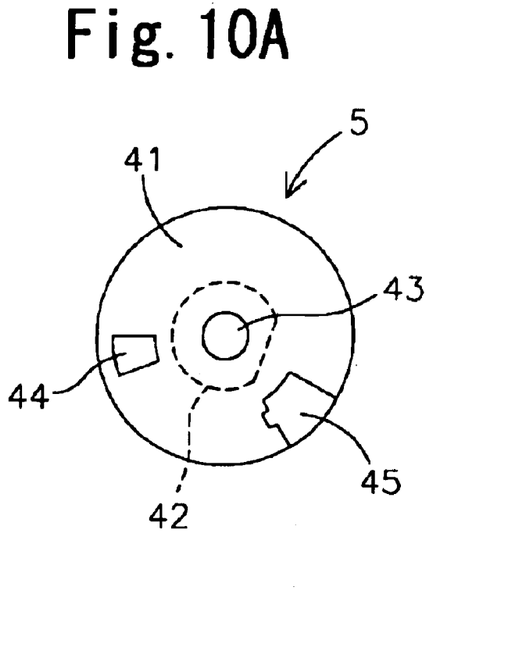
FIG. 10A is a front view of a rotor of the electrically-operated steering lock device according to the embodiment of the invention.
Figure 10B:
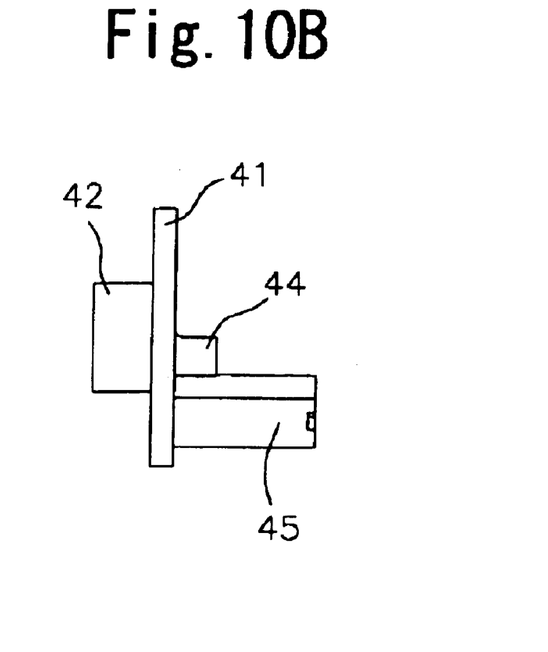
FIG. 10B is a side view of the rotor of the electrically-operated steering lock device according to the embodiment of the invention.

The rotor 5, as shown in FIGS. 10A and 10B, comprises a disc-shaped base portion 41, and a coupling portion 42 protruding in a generally D shape in cross section is formed on a rear face side, i.e. final reduction gear 4 side, of the base portion 41. This coupling portion 42 is fitted and coupled to the coupling hole 40 of the final reduction gear 4, and the rotor 5 is rotated together by rotation of the final reduction gear 4. Also, a shaft insertion hole 43 is provided at a center of the coupling portion 42 so as to extend therethrough and, as shown in FIG. 2, the rotor 5 is rotatably held by a shaft 46 which is inserted through the insertion hole 43 and fixed between the base 9 and a plate 12 for accommodating the final reduction gear 4 in the accommodation recessed portion 11b of the cover 11. Further, as shown in FIG. 10A, on a front face side of the base portion 41, are protrusively provided a locking-use engagement portion 44 and an unlocking-use engagement portion 45, respectively. The locking-use engagement portion 44 is to rotate later-described cam member 6 counterclockwise by engagement with the cam member 6, and the unlocking-use engagement portion 45 is to rotate the cam member 6 clockwise by engagement with the cam member 6.

Figure 11A:
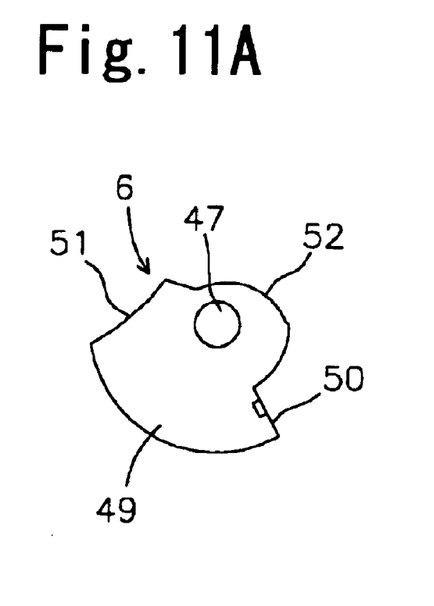
FIG. 11A is a front view of a cam member of the electrically-operated steering lock device according to the embodiment of the invention.
Figure 11B:
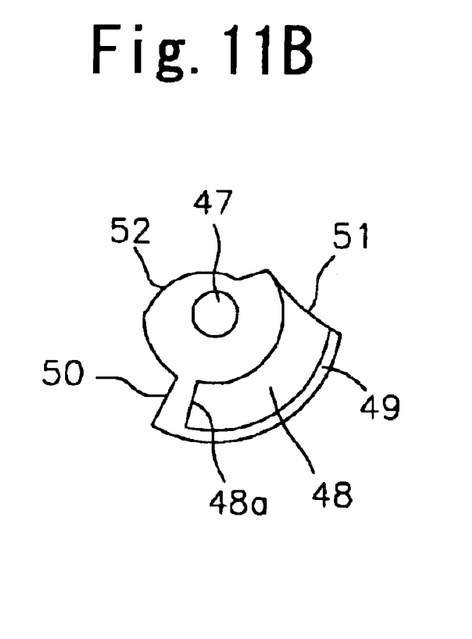
FIG. 11B is a rear view of the cam member of the electrically-operated steering lock device according to the embodiment of the invention.

The cam member 6 is generally fan-shaped in cross section as shown in FIGS. 11A and 11B, and a bearing hole 47 is provided at a central portion so as to run therethrough and is rotatably held by the shaft 46 inserted through the bearing hole 47. On an outer peripheral side of the bearing hole 47 of its rear face (i.e., rotor 5-side), a spring accommodation recess 48, which is opened at its one end and which has a spring receiving surface 48a formed on another end, is formed along an outer edge of circular-arc portion 49. The locking-use engagement portion 44 of the rotor 5 operably enters inside this spring accommodation recess 48, and a spring 54 is accommodated between the locking-side engagement portion 44 and the spring receiving surface 48a in the spring accommodation recess 48. Also, an engagement surface 50 with which the unlocking-use engagement portion 45 of the rotor 5 is to be engaged is formed on a side face of the circular-arc portion 49 of the cam member 6. Accordingly, referring to FIG. 3, as the rotor 5 is rotated clockwise, the unlocking-use engagement portion 45 is engaged with the engagement surface 50 of the cam member 6, thereby making the cam member 6 rotate clockwise together with the rotor. Meanwhile, as the rotor 5 is rotated counterclockwise, the locking-use engagement portion 44 of the rotor 5 biases and rotates the cam member 6 counterclockwise via the spring 54.

Further, the cam member 6 has, on one side face thereof, a first cam wall surface 51 for rotating the first lock bolt 1 from a protruding position to a retreat position by pressing the contact surface 18 of the first lock bolt 1 outwardly (toward a direction away from the steering shaft 97) via the cam member 6 rotating clockwise in FIG. 3. The cam member 6 also has a second cam wall surface 52 for rotating the first lock bolt 1 from the retreat position to the protruding position by pressing the contact surface 18 of the first lock bolt 1 inwardly (toward a direction approaching the steering shaft 97) via the cam member 6 rotating counterclockwise.

Figure 4:
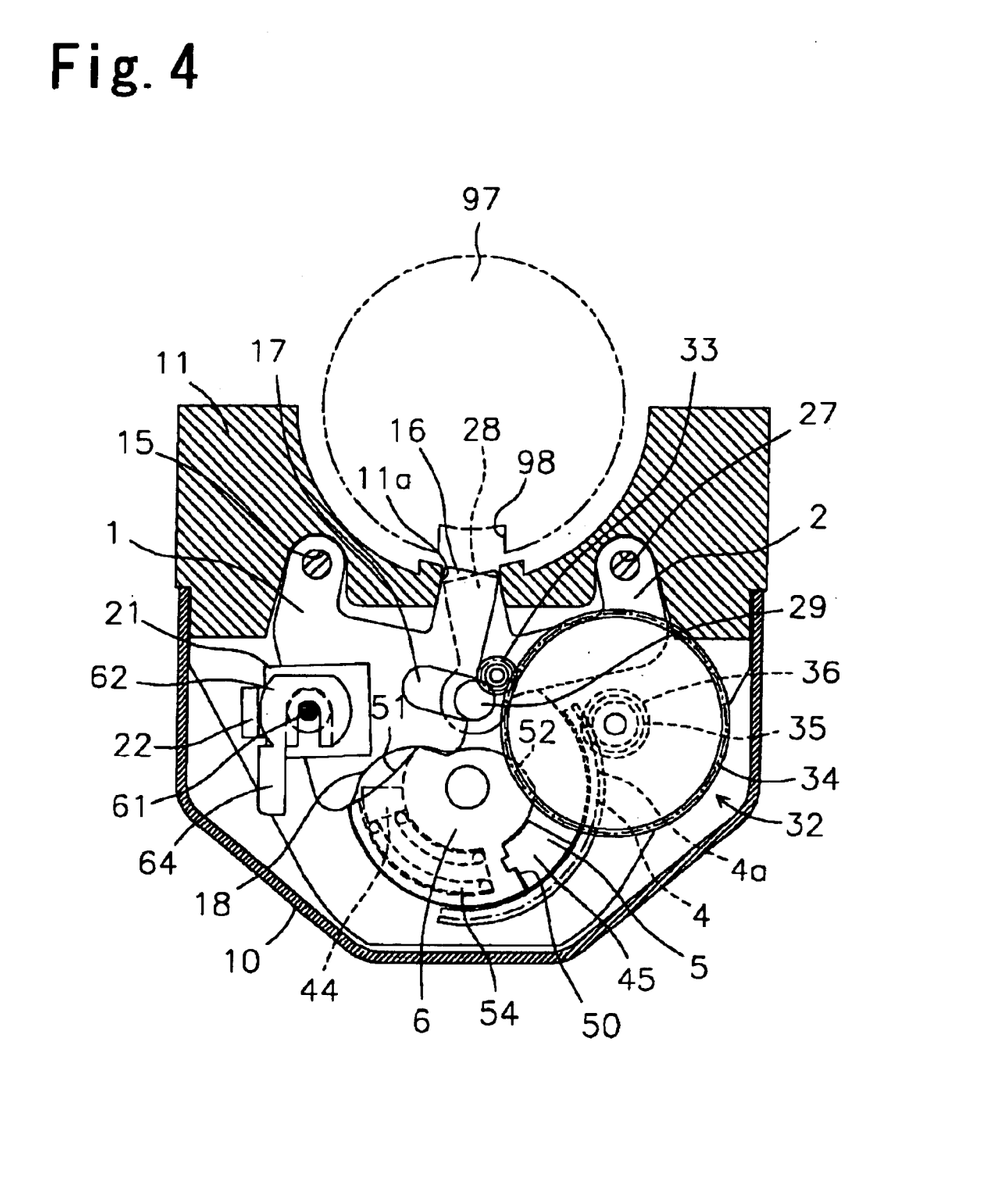
FIG. 4 is a view showing an unlocked state in FIG. 3.

The solenoid 7, which is actuated upon reception of a start-up signal from the control unit 76, has its plunger 61 moved toward a solenoid 7 side in its actuated state as shown in FIG. 1, and is fixed on the base 9. At a tip end portion of this plunger 61, is fixed a locking member 62 which is to be engaged with engagement protruding portion 22 of engagement piece 21 of the first lock bolt 1 to block rotation of the first lock bolt 1. Between this locking member 62 and the solenoid 7, a spring 63 is provided around the plunger 61, and the locking member 62 is biased toward the engagement piece 21 by a biasing force of the spring 63 while the solenoid 7 is not actuated. Then, in a state in which the first lock bolt 1 is in the retreat position, while the solenoid 7 is not actuated, a side wall of the locking member 62 is engaged with the engagement protruding portion 22 of the engagement piece 21 as shown in FIG. 4, thereby preventing the first lock bolt 1 from rotating toward the protruding position (i.e., counterclockwise). Further, under the locking member 62 of the solenoid 7, a move detection portion 64 is provided so as to extend from an underside thereof.

Below the solenoid 7, as shown in FIG. 1, is disposed a move detection switch 66 for detecting actuation of the plunger 61 of the solenoid 7, so that a detection portion 67 of the move detection switch 66 makes contact with the move detection portion 64 of the locking member 62 to detect actuation of the solenoid 7. This solenoid 7 is coupled to the control unit 76 by an unshown connecting line to transmit actuation of the solenoid 7 to the control unit 76.

Figure 12:
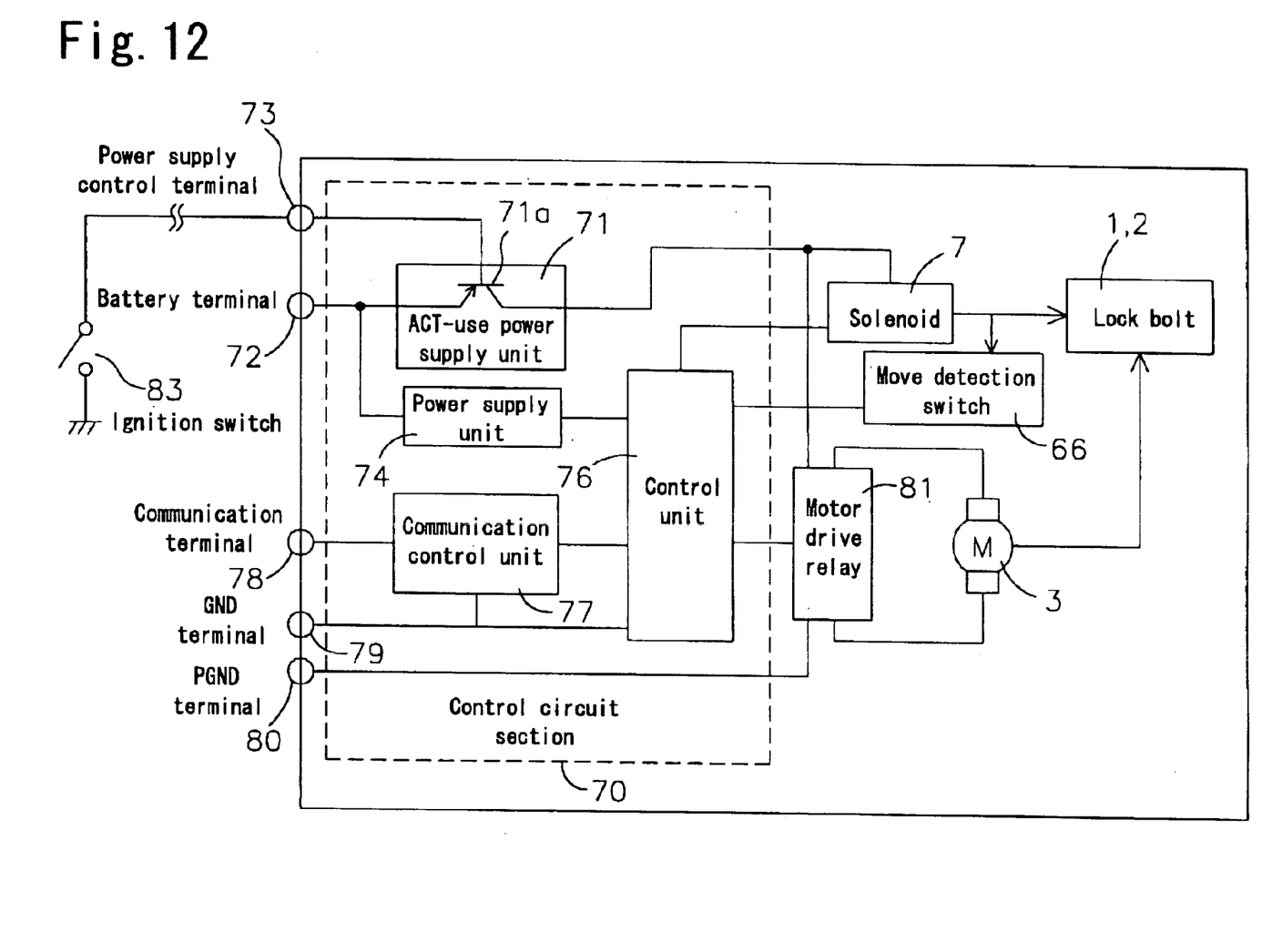
FIG. 12 is a block diagram of a control circuit section of the electrically-operated steering lock device according to the embodiment of the invention.

FIG. 12 shows a block diagram of a control circuit section 70 for controlling operations of the solenoid 7 and the motor 3 in the electrically-operated steering lock device of the present invention. This control circuit section 70 is made up of unshown electronic components on the printed circuit board 8. The solenoid 7 controlled by the control circuit section 70, and the motor drive relay 81 for operating the motor 3, are connected to a battery via an ACT-use power supply unit 71, which is a power supply control device, wherein a grounding-side terminal of the solenoid 7 is connected to the control unit 76 and a grounding-side terminal of the motor drive relay 81 is connected to a PGND terminal 80 to be grounded. The ACT-use power supply unit 71 is connected both to a battery terminal 72, which is connected to the battery, and to a power supply control terminal 73, which is connected to an ignition switch 83 for starting an engine. Furthermore, this ACT-use power supply unit 71 has a switch function of switching between supply and interruption of electric power to the solenoid 7 and the motor drive relay 81 according to an input signal derived from the power supply control terminal 73. Specifically, for example, within the ACT-use power supply unit 71 is provided a transistor 71a as a switching element, having an emitter connected to the battery terminal 72, a base connected to the power supply control terminal 73, and a collector connected to the solenoid 7 and the motor drive relay 81. Then, when the power supply control terminal 73 is grounded, power supply to the solenoid 7 and the motor drive relay 81 is effected. Meanwhile, when the power supply control terminal 73 is not grounded, power supply to the solenoid 7 and the motor drive relay 81 is interrupted.

Figure 13:
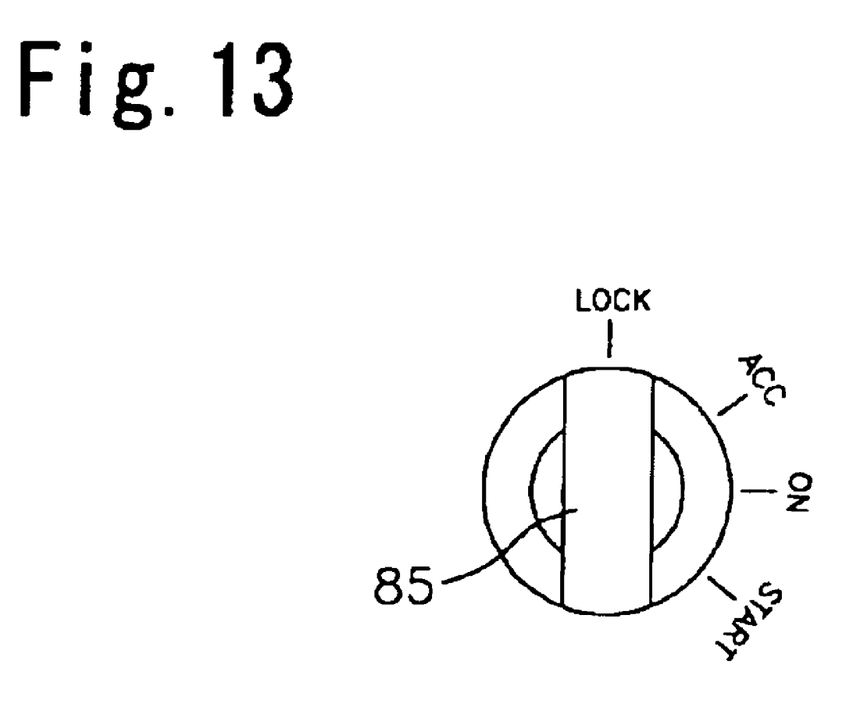
FIG. 13 is a view showing an operation knob of a vehicle.

The ignition switch 83, as shown in FIG. 13, is operated for a plurality of switch operations by rotation of an engine start-up operation knob 85 provided in the vehicle. As the engine start-up operation knob 85 is rotated from a LOCK position, where the steering shaft 97 is locked, to a START position via an ACC position and an ON position, the engine starts, ready for running. Then, with the operation knob 85 in the LOCK position as an example, the ignition switch 83 is energized into conduction so that the power supply control terminal 73 is grounded. With the operation knob 85 in the ACC position, the ON position or the START position, the ignition switch 83 is opened so that the power supply control terminal 73 is not grounded. With this arrangement, while the vehicle is running, the ACT-use power supply unit 71 interrupts power supply to the solenoid 7 and the motor drive relay 81. As a result, there is no possibility that the solenoid 7 and the motor 3 may be operated due to a malfunction or the like, so that a possibility that the steering shaft 97 is mis-locked while the vehicle is running can be eliminated.

The control circuit section 70 includes the control unit 76 for controlling operations of the solenoid 7 and the motor 3, and a communication control unit 77 for receiving and analyzing a steering unlocking signal and a locking signal directed from an exterior for a communication terminal 78, and for transmitting a specified signal to the control unit 76. The control unit 76 operates in connection with a power supply unit 74 connected to the battery terminal 72 and with a GND terminal 79 which is to be grounded, and the control unit 76, to which the grounding-side terminal of the solenoid 7, the move detection switch 66 and the motor drive relay 81 are connected, controls operations of the solenoid 7 and the motor 3 according to signals from the communication control unit 77 and the move detection switch 66.

Next, operation of the electrically-operated steering lock device having the above constitution is described.

While the operation knob 85 is in the LOCK position, the steering shaft 97 is locked, the ignition switch 83 is conducting, and the power supply control terminal 73 of the ACT-use power supply unit 71 is grounded. In this state, the solenoid 7 and the motor drive relay 81 are fed with electric power, thus being in an operable state. Further, in this state, the control unit 76, upon receiving via the communication control unit 77 a locking signal derived from the exterior, actuates the motor drive relay 81, so that an electric current is fed to the motor 3.

Then, with the electrically-operated steering lock device in the lock state shown in FIG. 3, when an electric current is fed to the motor 3 so that the motor 3 is driven, the final reduction gear 4, the rotor 5 and the cam member 6, in which the engagement surface 50 is engaged with the unlocking-use engagement portion 45 of the rotor 5, are rotated together clockwise via the rotating mechanism 32.

As the cam member 6 is rotated clockwise, the first cam wall surface 51 of the cam member 6 is brought into contact with the contact surface 18 of the first lock bolt 1, so that the first lock bolt 1 is pressed toward the retreat direction, thus being rotated clockwise. Also, the coupling convex portion 29 of the second lock bolt 2 protruding into the coupling-use elongate hole 17 of the first lock bolt 1 is moved into engagement, so that the second lock bolt 2 is also pressed toward the retreat direction so as to be rotated counterclockwise. When this occurs, as shown in FIG. 4, the protruding pieces 16, 28 of the first and second lock bolts 1, 2 move away from the receiving portion 98 of the steering shaft 97 of the vehicle, by which the steering shaft 97 is disengaged and unlocked.

In this case, the engagement piece 21 of the first lock bolt 1 slides and moves while the locking member 62 remains in contact with the top surface of the engagement protruding portion 22 of the engagement piece 21. When the first lock bolt 1 has moved to the retreat position, the contact between the engagement protruding portion 22 of the engagement piece 21 and the locking member 62 is released, and the locking member 62 is moved toward the engagement piece 21 by the biasing force of the spring 63, where the locking member 62 and the engagement protruding portion 22 are engaged with each other. In this state, even if the first lock bolt 1 tends to rotate in the protruding direction (counterclockwise), the first lock bolt 1 cannot rotate toward the lock side because the engagement protruding portion 22 of the engagement piece 21 fixed to the first lock bolt 1 is engaged with the locking member 62.

Then, when the cam member 6 is rotated to the position shown in FIG. 4, the final reduction gear 4 comes into contact with the side wall of the accommodation recessed portion 11b of the cover 11, thereby blocking rotation of the cam member 6. After a specified time elapse, the motor drive relay 81 is operated so that power to the motor 3 is cut off.

Then, after the steering shaft 97 is unlocked as described above, the operation knob 85 is rotated to the START position via the ACC position and the ON position, where the engine is started, resulting in a running-ready state. In this state, the ignition switch 83 is opened and the power supply control terminal 73 of the ACT-use power supply unit 71 is not grounded, so that the solenoid 7 and the motor drive relay 81 are not fed with electric power so as to be inoperable, thus the motor 3 is not operated. As a result, the first and second lock bolts 1, 2 are held in the retreat position, thus eliminating a possibility that the steering shaft 97 is locked during running of the vehicle.

Subsequently, when the operation knob 85 is operated to the LOCK position with the vehicle stopped, the ignition switch 83 goes to ON, the power supply control terminal 73 of the ACT-use power supply unit 71 becomes grounded, and the solenoid 7 and the motor drive relay 81 are fed with power so as to be operable. At this point in time, the control unit 76, receiving via the communication control unit 77 a locking signal derived from the exterior, makes the grounding-side terminal of the solenoid 7 grounded so as to operate the solenoid 7. As the solenoid 7 is operated so that the locking member 62 is moved toward the solenoid 7 by the plunger 61, engagement between the locking member 62 and the engagement protruding portion 22 of the engagement piece 21 is released. Then, upon detection of operation of the solenoid 7 by the move detection switch 66, the control unit 76 actuates the motor drive relay 81 so that an electric current in a reverse direction to that of the unlocking signal is fed to the motor 3.

Then, while the electrically-operated steering lock device is in the unlocked state shown in FIG. 4, an electric current is fed to the motor 3 so that the motor 3 is reversely rotated. Thus, the final reduction gear 4, the rotor 5 and the cam member 6, with which the locking-side engagement portion 44 of the rotor 5 is engaged through the spring 54, are rotated, via the rotating mechanism 32, together counterclockwise.

As the cam member 6 is rotated, the second cam wall surface 52 of the cam member 6 is brought into contact with the contact surface 18 of the first lock bolt 1, and the first lock bolt 1 is pressed in the protruding direction so as to be rotated counterclockwise. Further, the coupling convex portion 29 of the second lock bolt 2 protruding into the coupling-use elongate hole 17 of the first lock bolt 1 is moved into engagement, and the second lock bolt 2 is also pressed in the protruding direction so as to be rotated clockwise. During this operation, the protruding pieces 16, 28 of the first and second lock bolts 1, 2 are protruded outwardly from the through hole 11a of the cover 11, entering into the receiving portion 98 of the steering shaft 97 of the vehicle and thereby being engaged with the receiving portion 98 of the steering shaft 97, by which the steering shaft 97 is locked.

Then, as the cam member 6 is rotated to the position shown in FIG. 3, the final reduction gear 4 is brought into contact with the side wall of the accommodation recessed portion 11b of the cover 11, thereby being inhibited from rotation, and after a specified time elapse, the power supply to the motor 3 is cut off. Thereafter, the control unit 76 causes the grounding-side terminal of the solenoid 7 to be opened, thereby halting conduction to the solenoid 7, wherein the locking member 62 comes into contact with the top surface of the engagement protruding portion 22 of the engagement piece 21 by the biasing force of the spring 63.

In this state that the steering shaft 97 is locked, since the side wall of the cam member 6 is in contact with the first lock bolt 1, the first lock bolt 1 is held in the protruding position. Therefore, even if an attempt to operate the first lock bolt 1 is made by a magnet or the like with an aim of theft, it is impossible to achieve this operation. Further, even with an impact applied, since the first lock bolt 1 is never actuated, it is impossible to unlock the steering shaft 97.

Furthermore, the contact position between the first lock bolt 1 and the cam member 6 is set to such a position that when a force is applied to a retreat position side of the first lock bolt 1, the force is applied generally toward the rotational shaft of the cam member 6. Therefore, there occurs no application of rotational force to the cam member 6. Thus, the cam member 6 is not rotated, and so the first lock bolt 1 and the second lock bolt 2 interlocked with the first lock bolt 1 can be held in the protruding position with high reliability.

Figure 5:
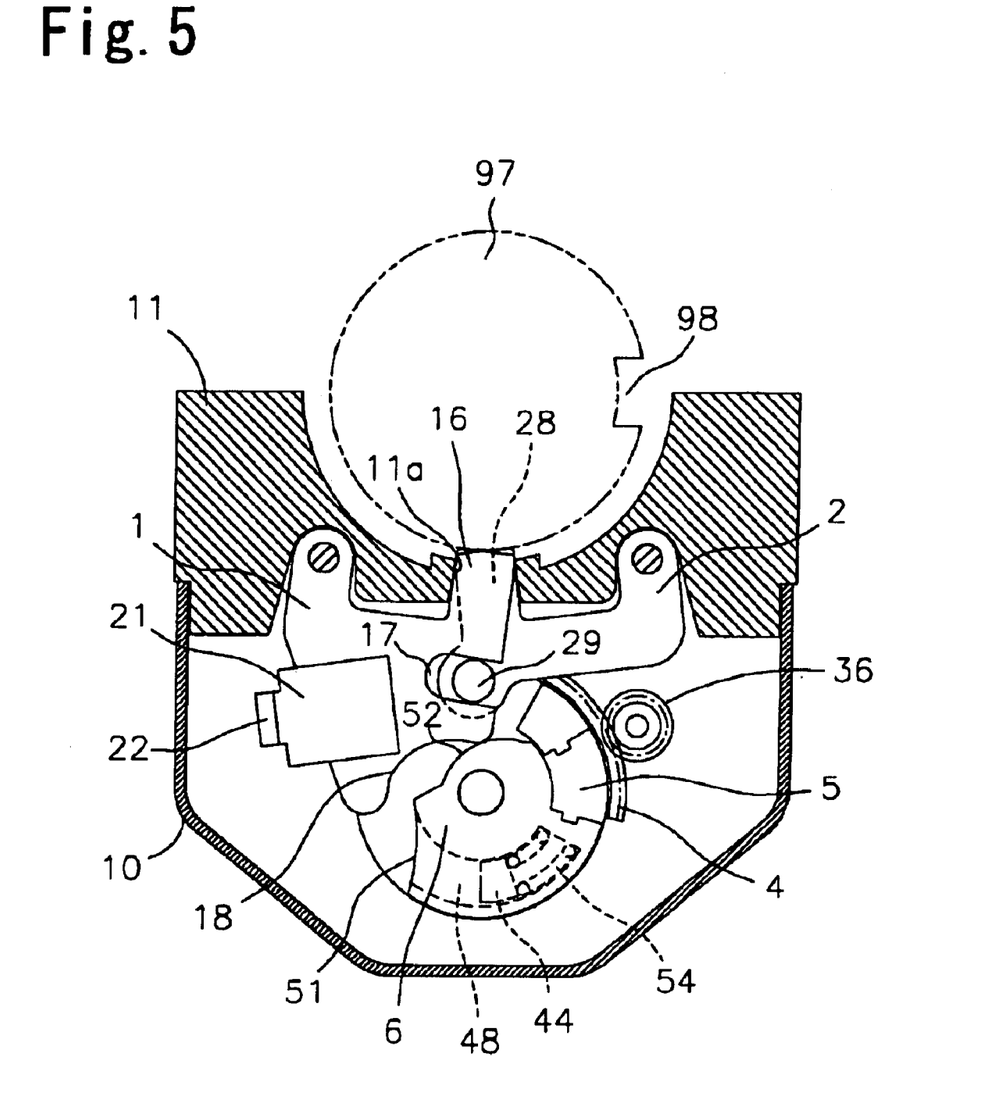
FIG. 5 is a sectional view showing an example of operation of the electrically-operated steering lock device according to the embodiment of the invention.

It is to be noted that, when the engine is stopped with the steering shaft 97 rotated from the neutral position as shown in FIG. 5, it may occur, in some cases, that the protruding pieces 16, 28 of the first and second lock bolts 1, 2 cannot be engaged with the receiving portion 98 of the steering shaft 97. In this case, the protruding pieces 16, 28 are in contact with the side surface of the steering shaft 97 so as to be inhibited from moving, and the cam member 6 is inhibited from rotating to the lock position (the position where the lock bolts 1, 2 are actuated to the protruding position). However, since the spring 54 is provided between the locking-use engagement portion 44 of the rotor 5 and the cam member 6, the rotor 5 is rotated, while compressing the spring 54, up to the lock position, and stopped there. Then, when the receiving portion 98 of the steering shaft 97 is rotated up to the position corresponding to the protruding pieces 16, 28, the protruding pieces 16, 28 become enterable into the receiving portion 98, so that the cam member 6 becomes rotatable. Thus, the cam member 6 is rotated counterclockwise by the biasing force of the compressed spring 54, thereby causing the first and second lock bolts 1, 2 to be rotated up to the protruding position, by which the steering shaft 97 is locked.

Further, when release of lock of the steering shaft 97 is attempted, a steering wheel torque may be applied thereto in some cases. For example, when a torque in a direction shown by an arrow A (clockwise direction) is applied to the steering shaft 97 as shown in FIG. 6, the sloped surface 16b of the first lock bolt 1 is not brought into contact with the receiving portion 98 of the steering shaft 97, but the acceptance surface 28a of the second lock bolt 2 is brought into contact with the receiving portion 98; thus, the acceptance surface 28a receives a pressing force derived from the steering shaft 97 in a direction generally orthogonal to the acceptance surface 28a. That is, the sloped surface 16b, which exerts a strong force in a rotational direction of the first lock bolt 1 when brought into contact with the receiving portion 98, does not make contact with the receiving portion 98. As a result of this, a force added by the steering wheel torque only causes a force to act along a direction generally vertical to a rotational direction of the second lock bolt 2, and almost no rotational force toward the retreat side is applied to the second lock bolt 2. As a consequence, a force with which the contact surface 18 of the first lock bolt 1 presses the side face of the cam member 6 via the coupling convex portion 29 can be reduced, so that the cam member 6 becomes rotatable with application of lighter force.

Further, when the cam member 6 is rotated clockwise, the second lock bolt 2 is rotated in such a manner that the acceptance surface 28a moves slightly away from a confronting surface of the receiving portion 98. As a result, a degree of engagement between the acceptance surface 28a and the receiving portion 98 is weakened, thereby making it easily achievable to pull the protruding piece 28 out from the receiving portion 98.

Meanwhile, when a torque in a direction shown by an arrow B (counterclockwise direction) is applied to the steering shaft 97, the sloped surface 28b of the second lock bolt 2 is not brought into contact with the receiving portion 98 of the steering shaft 97, but the acceptance surface 16a of the first lock bolt 1 is brought into contact with the receiving portion 98; thus, the acceptance surface 16a receives a pressing force derived from the steering shaft 97 in a direction generally orthogonal to the acceptance surface 16a. That is, the sloped surface 28b, which exerts a strong force in the rotational direction of the second lock bolt 2 when brought into contact with the receiving portion 98, does not make contact with the receiving portion 98. As a result of this, the force added by the steering wheel torque only causes a force to act along a direction generally orthogonal to the rotational direction of the first lock bolt 1, and almost no rotational force toward the retreat side is applied to the first lock bolt 1. As a consequence, the force with which the contact surface 18 of the first lock bolt 1 presses the side face of the cam member 6 can be reduced, so that the cam member 6 becomes rotatable with application of lighter force.

Further, as the cam member 6 is rotated clockwise, the first lock bolt 1 is rotated in such a manner that the acceptance surface 16a moves slightly away from the confronting surface of the receiving portion 98. As a result, a degree of engagement between the acceptance surface 16a and the receiving portion 98 is weakened, thereby making it easily achievable to pull the protruding piece 16 out from the receiving portion 98.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. An electrically-operated steering shaft lock device comprising:
   a lock bolt structure including
      (i) a first lock bolt pivotally supported on one radial side and in the vicinity of a steering shaft, and having a protruding piece to be engaged on an inner peripheral side thereof with an engagement surface of a receiving portion of the steering shaft, and
      (ii) a second lock bolt pivotally supported on another radial side and in the vicinity of the steering shaft, and having a protruding piece to be engaged on an inner peripheral side thereof with another engagement surface of the receiving portion of the steering shaft; and
   an actuating device for actuating only said first lock bolt so as to pivot said first lock bolt from a protruding position, at which said protruding piece of said first lock bolt is positioned within the receiving portion of the steering shaft, to a retreat position, at which said protruding piece of said first lock bolt is not positioned within the receiving portion of the steering shaft,
   wherein said first lock bolt and said second lock bolt are constructed and arranged such that
      (i) said second lock bolt is pivoted, along with said first lock bolt being pivoted to the protruding position, to a corresponding protruding position, at which said protruding piece of said second lock bolt is positioned within the receiving portion of the steering shaft, whereby the steering shaft becomes locked via said inner peripheral side surface of said first lock bolt engaging the engagement surface of the receiving portion and via said inner peripheral side surface of said second lock bolt engaging the another engagement surface of the receiving portion, and
      (ii) said second bolt is pivoted, along with said first lock bolt being pivoted via said actuating device to the retreat position, to a corresponding retreat position, at which said protruding piece of said second lock bolt is not positioned within the receiving portion of the steering shaft, whereby the steering shaft becomes unlocked via said inner peripheral side surface of said first lock bolt moving away from the engagement surface of the receiving portion and via said inner peripheral side surface of said second lock bolt moving away from the another engagement surface of the receiving portion, and
   wherein said second lock bolt is not actuated by an actuating device.

2. The electrically-operated steering shaft lock device according to claim 1, wherein
   said protruding piece of said first lock bolt has a sloped surface on an outer peripheral side thereof so as to prevent interference between said sloped surface and a surface of the receiving portion, and
   said protruding piece of said second lock bolt has a sloped surface on an outer peripheral side thereof so as to prevent interference between this sloped surface and a surface of the receiving portion.

3. The electrically-operated steering shaft lock device according to claim 1, further comprising:
   a coupling mechanism for allowing said second lock bolt to be pivoted in response to pivoting of said first lock bolt, and
   wherein said actuating device comprises a cam member having
      (i) a first cam wall surface for causing said first lock bolt to pivot from the protruding position to the retreat position, and holding said first lock bolt at the protruding position, and
      (ii) a second cam wall surface for causing said first lock bolt to pivot from the retreat position to the protruding position, and holding said first lock bolt at the protruding position.

4. The electrically-operated steering shaft lock device according to claim 3,
   wherein said coupling mechanism comprises a recess extending from an end surface of said first lock bolt and a protrusion extending from said second lock bolt, with said recess being constructed and arranged to receive said protrusion such that said first lock bolt becomes coupled with said second lock bolt.

5. The electrically-operated steering shaft lock device according to claim 4, wherein
   said first lock bolts has on said inner peripheral side thereof an acceptance surface for accepting torque of the steering shaft in a direction generally orthogonal to a pivotal direction of said first lock bolt, and
   said second lock bolt has on said inner peripheral side thereof an acceptance surface for accepting torque of the steering shaft in a direction generally orthogonal to a pivotal direction of said second lock bolt.

6. The electrically-operated steering shaft lock device according to claim 5, further comprising:
   a spring for biasing said cam member in a direction toward a lock position; and
   a rotor having an engagement portion to be brought into contact with one end side of the spring so as to cause said cam member to rotate toward the lock position via said spring, said rotor to be driven by a motor so as to bring said engagement portion of said rotor into contact with said one end side of said spring,
   wherein when said first lock bolt is unable to be actuated so as to pivot to the protruding position, said spring absorbs movement of said rotor and biases said cam member toward the lock position.

7. The electrically-operated steering shaft lock device according to claim 6, wherein
   said protruding piece of said first lock bolt has a sloped surface on an outer peripheral side thereof so as to prevent interference between said sloped surface and a surface of the receiving portion, and
   said protruding piece of said second lock bolt has a sloped surface on an outer peripheral side thereof so as to prevent interference between this sloped surface and a surface of the receiving portion.

8. The electrically-operated steering shaft lock device according to claim 3, wherein
   said first lock bolt has on said inner peripheral side thereof an acceptance surface for accepting torque of the steering shaft in a direction generally orthogonal to a pivotal direction of said first lock bolt, and
   said second lock bolt has on said inner peripheral side thereof an acceptance surface for accepting torque of the steering shaft in a direction generally orthogonal to a pivotal direction of said second lock bolt.

9. The electrically-operated steering shaft lock device according to claim 3, further comprising:
   a spring for biasing said cam member in a direction toward a lock position; and
   a rotor having an engagement portion to be brought into contact with one end side of the spring so as to cause said cam member to rotate toward the lock position via said spring, said rotor to be driven by a motor so as to bring said engagement portion of said rotor into contact with said one end side of said spring, wherein when said first lock bolt is unable to be actuated so as to pivot to the protruding position, said spring absorbs movement of said rotor and biases said cam member toward the lock position.

10. The electrically-operated steering shaft lock device according to claim 1, wherein said first lock bolt has on said inner peripheral side thereof an acceptance surface for accepting torque of the steering shaft in a direction generally orthogonal to a pivotal direction of said first lock bolt, and said second lock bolt has on said inner peripheral side thereof an acceptance surface for accepting torque of the steering shaft in a direction generally orthogonal to a pivotal direction of said second lock bolt.

11. The electrically-operated steering shaft lock device according to claim 1, wherein the engagement surface of the receiving portion faces the another engagement surface of the receiving portion such that when said protruding piece of said first lock bolt is engaged on said inner peripheral side thereof with the engagement surface, and said protruding piece of said second lock bolt is engaged on said inner peripheral side thereof with the another engagement surface, said inner peripheral side of said protruding piece of said first lock bolt and said inner peripheral side of said protruding piece of said second lock bolt are not directed toward one another.

12. The electrically-operated steering shaft lock device according to claim 11, further comprising:

a coupling mechanism for allowing said second lock bolt to be pivoted in response to pivoting of said first lock bolt, and wherein said actuating device comprises a cam member having (i) a first cam wall surface for causing said first lock bolt to pivot from the protruding position to the retreat position, and holding said first lock bolt at the protruding position, and (ii) a second cam wall surface for causing said first lock bolt to pivot from the retreat position to the protruding position, and holding said first lock bolt at the protruding position.

13. The electrically-operated steering shaft lock device according to claim 12, wherein said coupling mechanism comprises a recess extending from an end surface of said first lock bolt and a protrusion extending from said second lock bolt, with said recess being constructed and arranged to receive said protrusion such that said first lock bolt becomes coupled with said second lock bolt.

14. The electrically-operated steering shaft lock device according to claim 13, wherein said first lock bolt has on said inner peripheral side thereof an acceptance surface for accepting torque of the steering shaft in a direction generally orthogonal to a pivotal direction of said first lock bolt, and said second lock bolt has on said inner peripheral side thereof an acceptance surface for accepting torque of the steering shaft in a direction generally orthogonal to a pivotal direction of said second lock bolt.

15. The electrically-operated steering shaft lock device according to claim 14, further comprising:

a spring for biasing said cam member in a direction toward a lock position; and a rotor having an engagement portion to be brought into contact with one end side of the spring so as to cause said cam member to rotate toward the lock position via said spring, said rotor to be driven by a motor so as to bring said engagement portion of said rotor into contact with said one end side of said spring, wherein when said first lock bolt is unable to be actuated so as to pivot to the protruding position, said spring absorbs movement of said rotor and biases said cam member toward the lock position.

16. The electrically-operated steering shaft lock device according to claim 15, wherein said protruding piece of said first lock bolt has a sloped surface on an outer peripheral side thereof so as to prevent interference between said sloped surface and a surface of the receiving portion, and said protruding piece of said second lock bolt has a sloped surface on an outer peripheral side thereof so as to prevent interference between this sloped surface and a surface of the receiving portion.

17. The electrically-operated steering shaft lock device according to claim 12, wherein said first lock bolt has on said inner peripheral side thereof an acceptance surface for accepting torque of the steering shaft in a direction generally orthogonal to a pivotal direction of said first lock bolt, and said second lock bolt has on said inner peripheral side thereof an acceptance surface for accepting torque of the steering shaft in a direction generally orthogonal to a pivotal direction of said second lock bolt.

18. The electrically-operated steering shaft lock device according to claim 12, further comprising:

a spring for biasing said cam member in a direction toward a lock position; and a rotor having an engagement portion to be brought into contact with one end side of the spring so as to cause said cam member to rotate toward the lock position via said spring, said rotor to be driven by a motor so as to bring said engagement portion of said rotor into contact with said one end side of said spring, wherein when said first lock bolt is unable to be actuated so as to pivot to the protruding position, said spring absorbs movement of said rotor and biases said cam member toward the lock position.

19. The electrically-operated steering shaft lock device according to claim 11, wherein said first lock bolt has on said inner peripheral side thereof an acceptance surface for accepting torque of the steering shaft in a direction generally orthogonal to a pivotal direction of said first lock bolt, and said second lock bolt has on said inner peripheral side thereof an acceptance surface for accepting torque of the steering shaft in a direction generally orthogonal to a pivotal direction of said second lock bolt.

20. The electrically-operated steering shaft lock device according to claim 11, wherein said protruding piece of said first lock bolt has a sloped surface on an outer peripheral side thereof so as to prevent interference between said sloped surface and a surface of the receiving portion, and said protruding piece of said second lock bolt has a sloped surface on an outer peripheral side thereof so as to prevent interference between this sloped surface and a surface of the receiving portion.

* * * * *